United States Patent
Eunkyu et al.

(10) Patent No.: US 6,710,594 B2
(45) Date of Patent: Mar. 23, 2004

(54) METHOD AND APPARATUS SUPPORTING MAGNETIC PERFORMANCE MEASUREMENT OF MERGED READ-WRITE HEADS USING THE WRITE CURRENT AND READ CURRENT

(75) Inventors: Eunkyu Eunkyu, Santa Clara, CA (US); Hyung Jai Lee, Cupertino, CA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/103,485

(22) Filed: Mar. 20, 2002

(65) Prior Publication Data

US 2003/0178991 A1 Sep. 25, 2003

(51) Int. Cl.[7] ................ G01R 33/12; G11B 5/455
(52) U.S. Cl. ............ 324/210; 29/603.01; 29/603.03; 360/31; 324/537; 324/656
(58) Field of Search ............... 324/210–212; 360/317, 323; 29/593, 603.01, 603.03; 438/17

(56) References Cited

U.S. PATENT DOCUMENTS

| | | | | | |
|---|---|---|---|---|---|
| 5,589,777 | A | * | 12/1996 | Davis et al. ............... | 324/537 |
| 6,025,712 | A | * | 2/2000 | Mian ......................... | 324/210 |
| 6,140,814 | A | * | 10/2000 | Sundaram .................. | 324/212 |
| 6,340,885 | B1 | * | 1/2002 | Hachisuka et al. ......... | 324/210 |
| 6,400,534 | B1 | * | 6/2002 | Klaassen ................... | 360/323 |
| 6,472,866 | B2 | * | 10/2002 | Aslami ...................... | 324/210 |
| 6,534,974 | B1 | * | 3/2003 | Bowen et al. ............. | 324/210 |

OTHER PUBLICATIONS

Jang et al "Micro–track Profiles of ESD Damaged AMR and GMR Heads," IEEE Transactions on Magnetics, vol. 35, No. 5, Sep. 1999, pp. 2616–2618.*

* cited by examiner

Primary Examiner—N. Le
Assistant Examiner—Darrell Kinder
(74) Attorney, Agent, or Firm—Gregory Smith & Associates; Jeffrey P. Aiello; Earle Jennings

(57) ABSTRACT

A test system and method determining performance of a merged magnetoresistive read-write head based upon operating the write inductive head of the merged read-write head, measuring the resistance of the read head under certain read current bias conditions and finding which read heads have been damaged by ESD.

30 Claims, 13 Drawing Sheets

METHOD AND APPARATUS SUPPORTING MAGNETIC PERFORMANCE MEASUREMENT OF MERGED READ-WRITE HEADS USING THE WRITE CURRENT AND READ CURRENT

TECHNICAL FIELD

This invention relates to magnetic performance measurement of a merged type magneto-resistive head during the read process in a disk drive, including at least any of the collection comprising AMR (Anisotropic Magneto-resistive), GMR (Giant Magneto-resistive), and TMR (Tunneling Magneto-resistive) read-write head.

BACKGROUND ART

Disk drives are an important data storage technology, based on several crucial components. These components include the read-write heads, which directly communicate with a disk surface containing the data storage medium. This invention involves magnetic performance measurement of the read-write heads inductively using the write heads.

FIG. 1A illustrates a typical prior art high capacity disk drive 10 including actuator arm 30 with voice coil 32, actuator axis 40, suspension or head arms 50–58 with slider/head unit 60 placed among the disks.

FIG. 1B illustrates a typical prior art high capacity disk drive 10 with actuator 20 including actuator arm 30 with voice coil 32, actuator axis 40, head arms 50–56 and slider/head units 60–66 with the disks removed.

Since the 1980's, high capacity disk drives 10 have used voice coil actuators 20–66 to position their read-write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

Merged type heads possess different components for reading and writing, because the magneto-resistive effect only occurs during reading. A merged type head typically includes a thin film head and a spin valve sensor. The primary use of the thin film head is in the write process. The spin valve sensor is used for reading.

MR heads have several advantages over earlier approaches, using a single component, for both read and write. Earlier read-write heads were a study in tradeoffs. The single component, often a ferrite core, can increase read sensitivity with additional windings around the core. However, these added windings make the ferrite core write less efficiently.

Introduced in the 1990's, merged heads brought significant increases in areal density. A merged type head reads the disk surface using a spin valve, containing a conductive thin film, whose resistance changes in the presence of a magnetic field. By separating the functions of writing and reading, each function can be optimized further than would be possible for the older read-write heads. For all the improvement that merged heads bring, their control to date creates problems. However, before discussing these problems, consider first how and what controls these devices in contemporary disk drives.

FIG. 2A illustrates a simplified schematic of a disk drive controller 1000 controlling an analog read-write interface 220, the read differential signal pair (r+ and r−) and write differential signal pair (w+ and w−) communicating the resistivity found in the spin valve within MR read-write head 200 of the prior art.

FIG. 2B illustrates a suspended head slider 60 containing the MR read-write head 200 of the prior art.

FIG. 2C illustrates a perspective view of merged read-write head 200 from FIG. 2B including write inductive head 202 and magnetoresistive read head (or spin valve) 204 of the prior art.

FIG. 2D illustrates a simplified cross section view of spin valve 204 of FIG. 2C of the prior art.

FIGS. 3A and 3B illustrate the magnetic flux direction related to the charging of the write differential signal pair connecting to P1 and P2 of the prior art.

FIG. 3A illustrates the field flowing from P1 to P2, when there is a positive write current asserted on the write differential signal pair under normal conditions in the prior art.

FIG. 3B illustrates the field flowing from P2 to P1, when there is a negative write current asserted on the write differential signal pair under normal conditions in the prior art.

Electro-Static Discharge (ESD) can diminish or damage these flows by pinning part of the spin valve head 204 in a weakened or reversed magnetic condition. Such conditions damage or destroy the ability of the spin valve 204, thus the MR read-write head 200 to function.

FIG. 4A depicts the voltage amplitude measured across the read differential signal pair sensing a written pulse on a disk drive surface in the prior art.

As used in the prior art, the amplitude is defined as $v_+ + v_-$. Asymmetry is defined as $v_+ - v_-$. The quality measure for spin valves is asymmetry vs. amplitude, or $$(v_+ - v_-)/(v_+ + v_-).$$

The ideal situation would have a quality measure of 0%, but acceptable ranges are often 5% to 10%, with 7% being typical for a spin valve. Note that ESD damage is indicated by increases in the quality measure.

Typically, either a quasi-static tester or R(H) tester is used to test the spin valve for ESD damage. Both forms of testers require external magnets, often generating at least 1,000 Oesteds. The external magnets further require power supplies, and a mechanical infrastructure to accurately position the magnet with respect to these very small components. All of this adds to the cost of testing and therefore manufacturing MR read-write heads, as well as the products containing these read-write heads, including head sliders, actuator arms, voice coil actuators and disk drives.

Another alternative is the use of a disk media based tester such as manufactured by Guzik. While somewhere in the process of making a voice coil actuator, testing must be done using disk media, this is even more expensive than quasi-static or R(H) testing.

To summarize, what is needed are test circuits and methods reducing the cost of testing and manufacturing MR read-write heads, and products containing these read-write heads (head sliders, actuator arms, voice coil actuators and disk drives).

SUMMARY OF THE INVENTION

The invention includes a test system and method determining performance of a merged magnetoresistive read-write head based upon operating the write inductive head and measuring the resistance of the read head under certain read current bias conditions selecting read heads undamaged by ESD.

The invention removes the requirement for an external magnet or disk memory media surface to determine whether a merged magneto-resistive read-write head has been damaged by Electro-Static Discharge (ESD).

The system and method can be applied at the wafer fabrication manufacturing stage to the read-write heads, as well as the assembly stages for head sliders, actuator arms, and voice coil actuators. The invention includes the products of these manufacturing stages using the method, as well as disk drives assembled from these components.

This invention significantly reduces production cost of testing for ESD damage.

Note that the inventive method can be implemented at least in part by the operation and control provided by one or more of the following: a computer, a finite state machine, a neural network and/or a human operator. While the following discussion is focused on computer operations, this has been done strictly to clarify the discussion and is not meant to limit the scope of the claims.

These and other advantages of the present invention will become apparent upon reading the following detailed descriptions and studying the various figures of the drawings.

DETAILED DESCRIPTION OF THE INVENTION

Figure 1A:
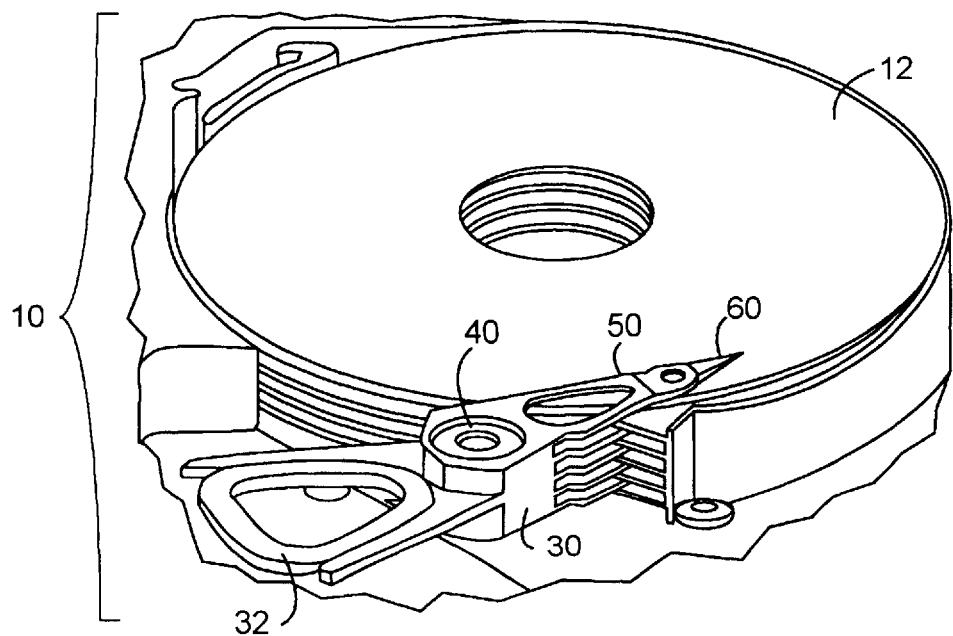
FIG. 1A illustrates a typical prior art high capacity disk drive 10 including actuator arm 30 with voice coil 32, actuator axis 40, suspension or head arms 50–58 with slider/head unit 60 placed among the disks.
Figure 1B:
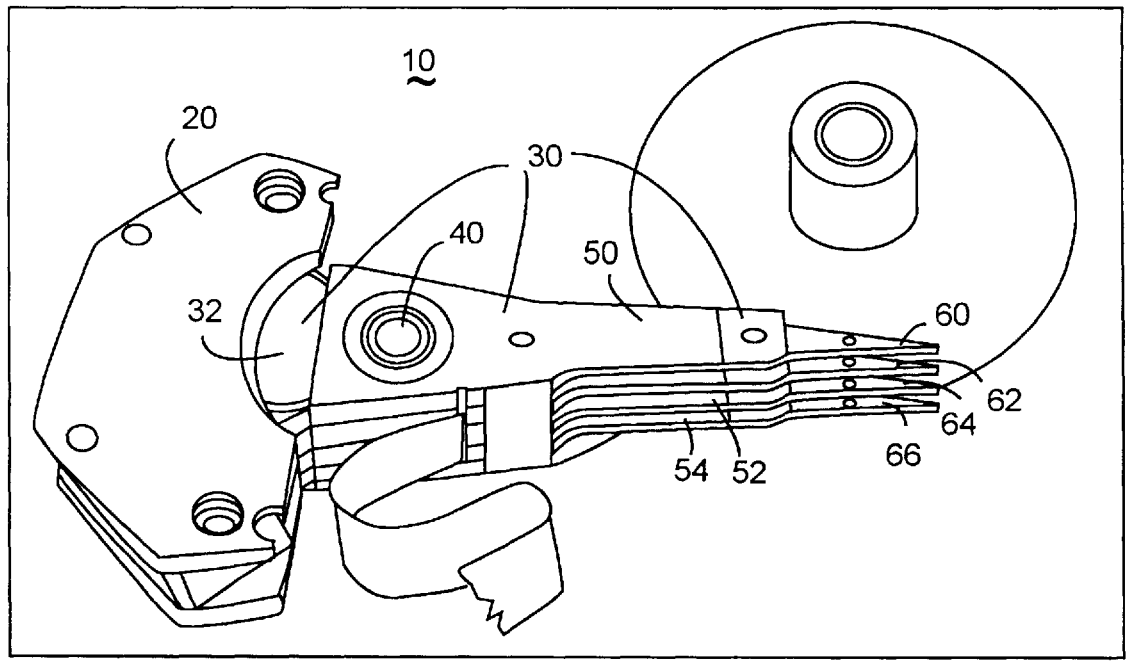
FIG. 1B illustrates a typical prior art high capacity disk drive 10 with actuator 20 including actuator arm 30 with voice coil 32, actuator axis 40, head arms 50–56 and slider/head units 60–66 with the disks removed.
Figure 2A:
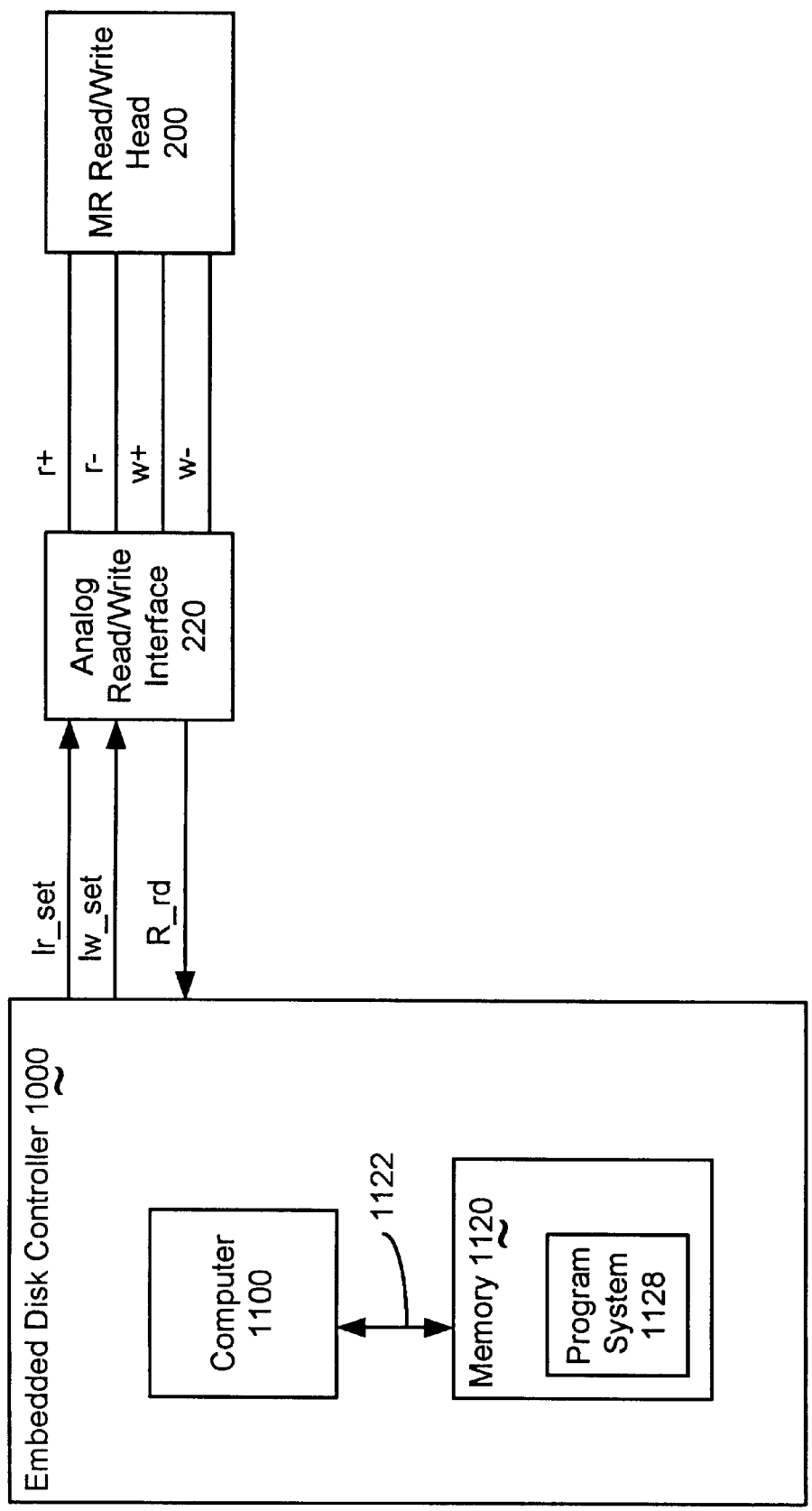
FIG. 2A illustrates a simplified schematic of a disk drive controller 1000 controlling an analog read/write interface 220, the read differential signal pair (r+ and r−) and write differential signal pair (w+ and w−) communicating the resistivity found in the spin valve within MR read/write head 200 of the prior art.
Figure 2B:
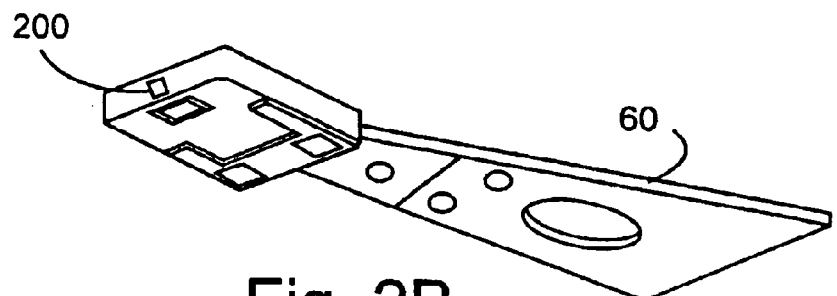
FIG. 2B illustrates a suspended head slider 60 containing the MR read-write head 200 of the prior art.
Figure 2C:
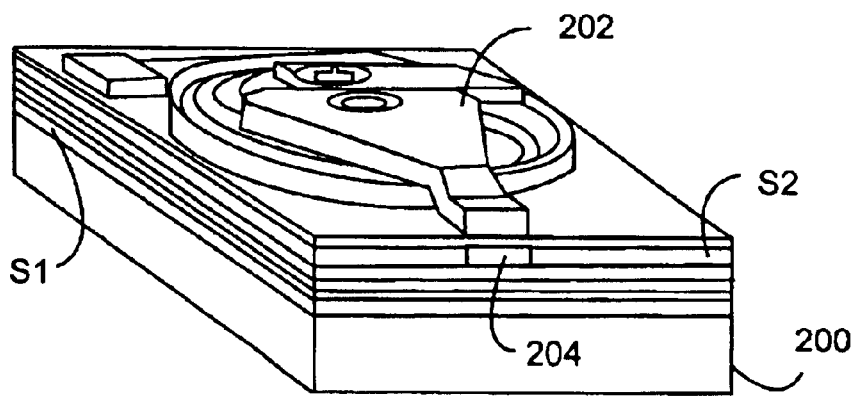
FIG. 2C illustrates a perspective view of merged read-write head 200 from FIG. 2B including write inductive head 202 and magnetoresistive read head (or spin valve) 204 of the prior art.
Figure 2D:
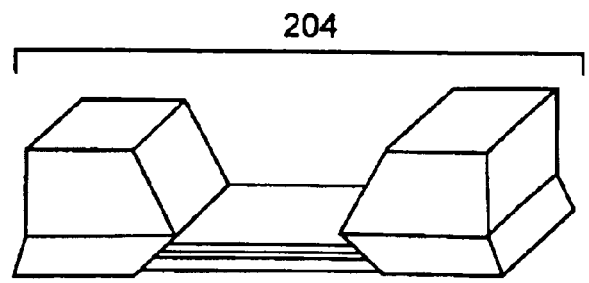
FIG. 2D illustrates a simplified cross section view of spin valve 204 of FIG. 2C of the prior art.
Figure 3A:
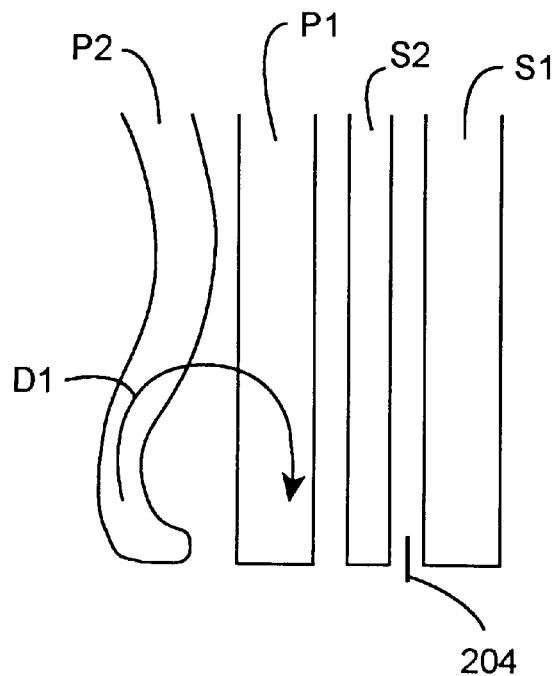
FIGS. 3A and 3B illustrate the magnetic flux direction related to the charging of the write differential signal pair connecting to P1 and P2 of the prior art.
Figure 3B:
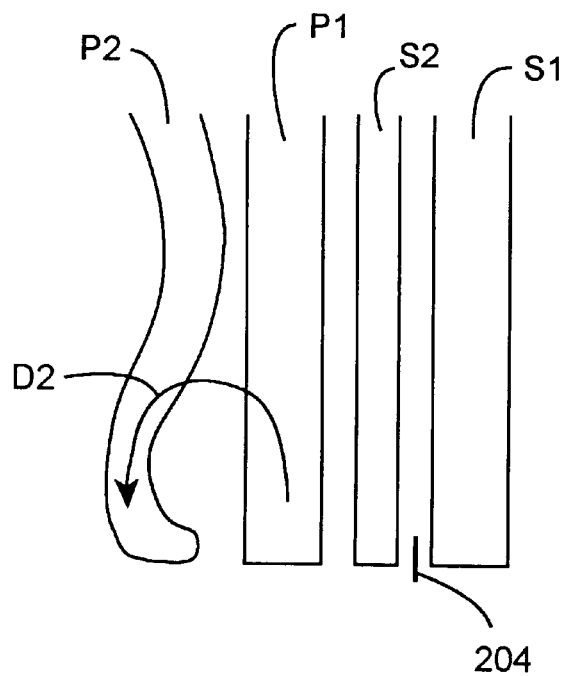
Figure 4A:
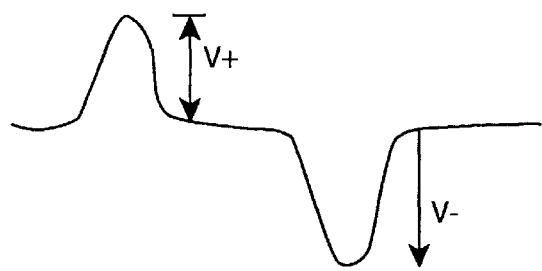
FIG. 4A depicts the voltage amplitude measured across the read differential signal pair sensing a written pulse on a disk drive surface in the prior art.
Figure 4B:
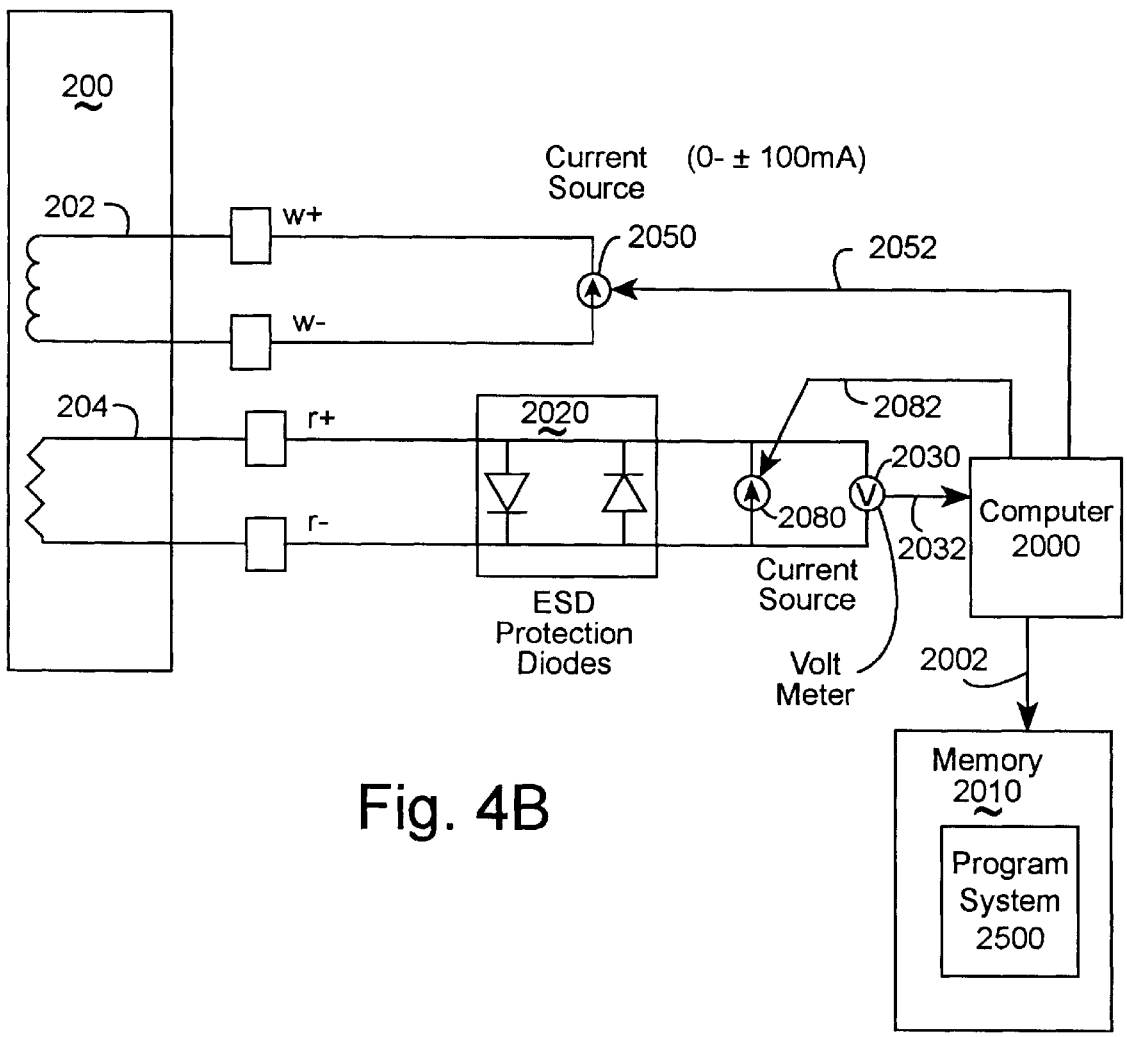
FIG. 4B illustrates a system determining performance of a merged magnetoresistive read-write head 200 to select a passed read-write head.

FIG. 4B illustrates a system determining performance of a merged magnetoresistive read-write head 200 to select a passed read-write head.

Write current source 2050 drives write differential signal pair w+ and w− of merged magnetoresistive read-write head 200 at a first write current level.

Read current source 2080 drives a read differential signal pair of merged magnetoresistive read-write head 200 at a first read current level.

Volt meter 2030 measures across the read differential signal pair r+ and r− to create a first voltage reading.

ESD protection circuit 2020 couples across the read differential signal pair r+ and r− protecting merged magnetoresistive read-write head 200 from ESD. Note that it is preferable with today's technology to use a dual diode circuit as shown herein, but ESD protection may be provided by other approaches, which may include integration of ESD protection into volt meter 2030 and/or read current source 2080.

Computer 2000 may provide a first Merged Read-write head Resistivity (hereafter "MRR") generated using a means for determining a first MRR as essentially the first voltage reading divided by the first read current level.

Note that as used herein, the phrase "essentially as" will be used to denote the approximate nature of some or many of the calculations in the system and method of the invention. By way of example, it may be preferable to compute division based upon fixed-point numeric representations of the first voltage reading and the first read current level. Alternatively, division of floating point numeric representations may be used, or conceivably, the logarithms of the absolute values of the numbers involved may be taken, subtracted, and then exponentiated to approximate the first MRR. In at least each of these cases, the resulting number is essentially the first MRR.

A second MRR is created by control of at least one member of the current source collection comprising the read current source 2080 and the write current source 2050.

A differential MRR is essentially the first MRR minus the second MRR.

The merged magnetoresistive read-write head 200 is evaluated based upon the differential MRR to select the passed read-write head. This may be implemented as passing merged magnetoresistive read-write head 200 based upon when the differential MRR is essentially non-positive.

The second MRR may be created by at least one of the following: the write current source 2050 driving at a second write current level to create the second MRR and read current source 2080 driving at a second read current level to create the second MRR.

The method of testing may be implemented as a program system 2500 composed of program steps residing in memory 2010, which is accessibly coupled 2002 to computer 2000.

Figure 5A:
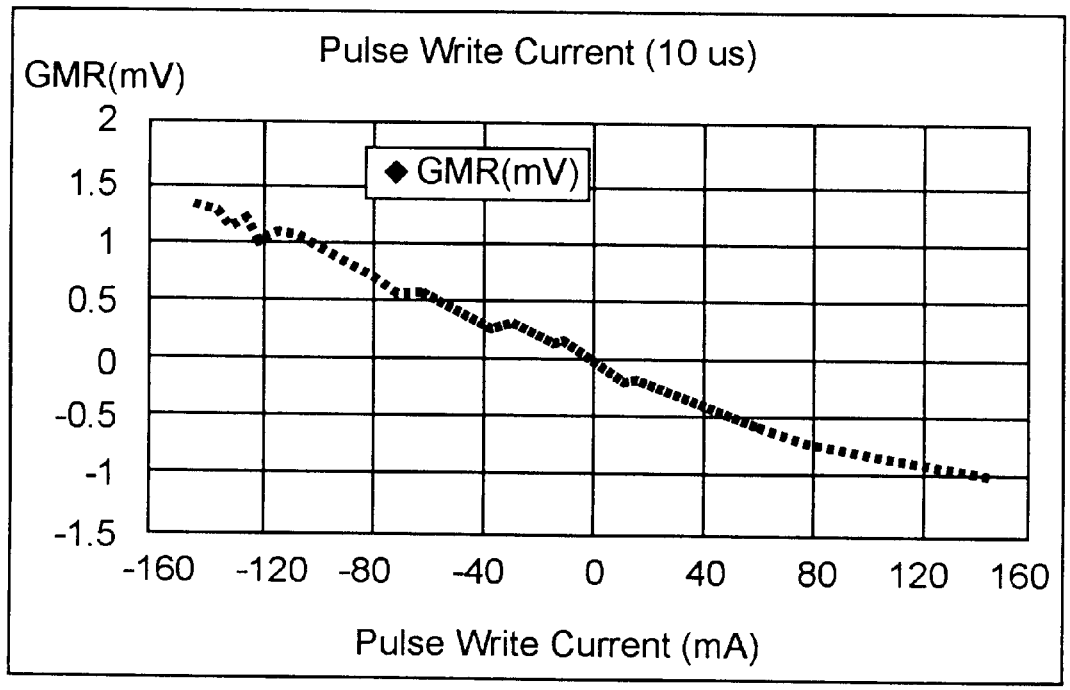
FIG. 5A illustrates the voltage measurements in mV versus the write current level in mA as found with a test system as in FIG. 4B.

FIG. 5A illustrates the voltage measurements in mV versus the write current level in mA as found with a test system as in FIG. 4B.

Figure 5B:
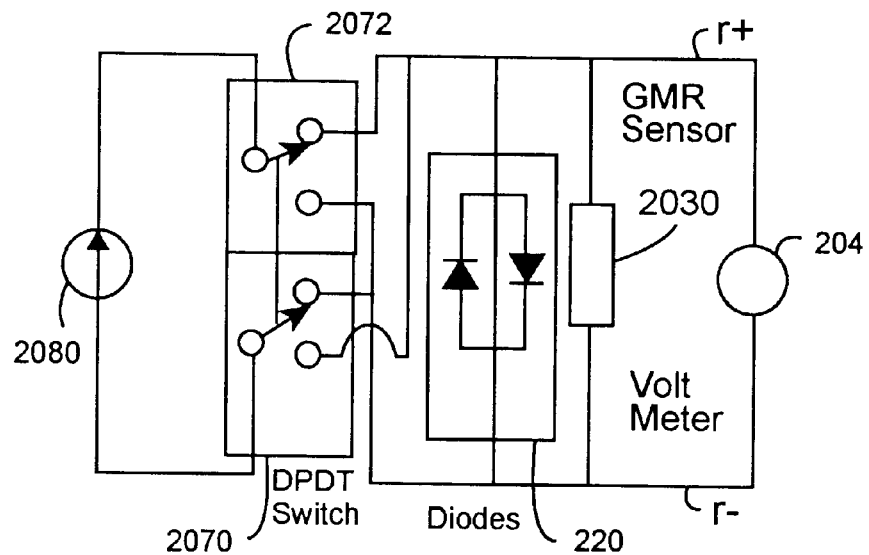
FIG. 5B illustrates a variation on the circuit of FIG. 4B with regards to the read head 204 and read differential signal pair r+ and r− additionally containing a Double Pole Double Throw (DPDT) switch.

FIG. 5B illustrates a variation on the circuit of FIG. 4B with regards to the read head 204 and read differential signal pair r+ and r− additionally containing a Double Pole Double Throw (DPDT) switch.

The DPDT switch controls the polarity coupling of read current source 2080 with regards the read differential signal pair. Note that DPDT switch may be implemented as two multiplexors 2070 and 2072.

Circuits such as those shown in FIG. 5B are capable of generating a second MRR by controlling read current source 2080 at a second read current level, which is essentially the negative of the first read current level. Volt meter 2030 measures a second voltage reading across the read differential signal pair to create a second voltage reading. The second MRR is essentially the second voltage reading divided by the second current level.

Figure 6A:
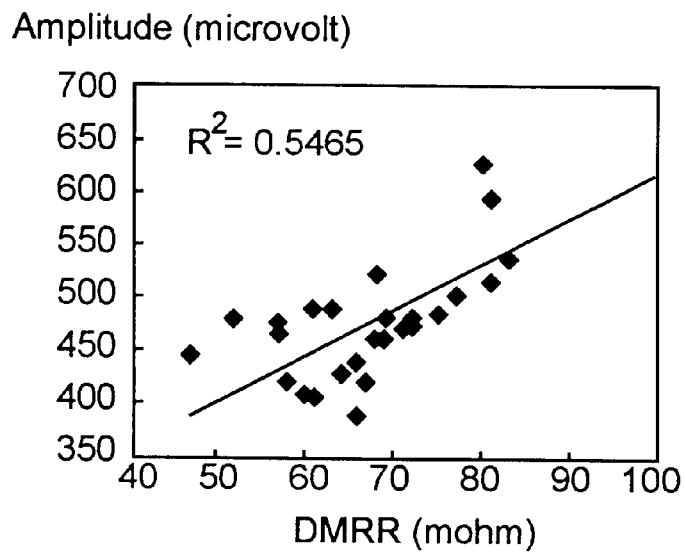
FIG. 6A illustrates a comparison of experimental results obtained by the inventors between the differential MRR in milli-ohms along the horizontal axis and voltage measurements by a Quasi-static tester in micro-volts along the vertical axis.

FIG. 6A illustrates a comparison of experimental results obtained by the inventors between the differential MRR in milli-ohms along the horizontal axis and voltage measurements by a Quasi-static tester in micro-volts along the vertical axis.

R is the correlation factor and is essentially 74%. Note that R is derived from experimental data. The inventors find this is a high enough correlation to replace quasi-static testing.

Figure 6B:
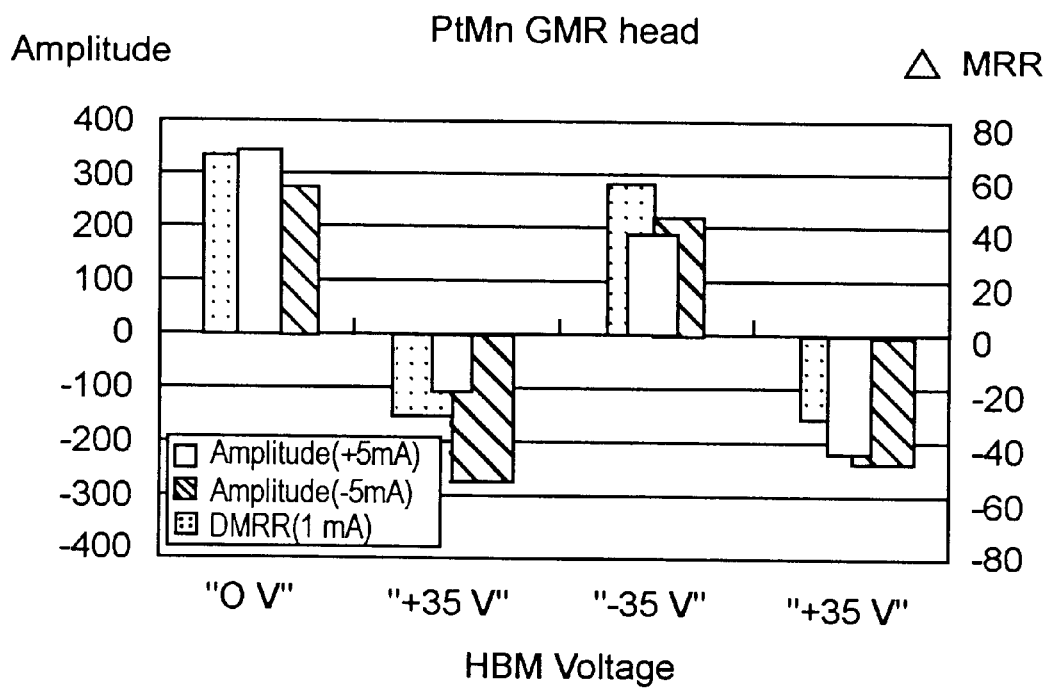
FIG. 6B illustrates a comparison between the normal state and the pin reversed state of an SV head 204 such as found after damage by an ESD event.

FIG. 6B illustrates a comparison between the normal state and the pin reversed state of an SV head 204 such as found after damage by an ESD event for a platinum-magnesium GMR read-write head (PTMn GMR Head).

The right hand vertical axis shows the amplitude in microvolts observed by a quasi-static tester. The left hand vertical axis shows the differential MRR measured in milli-ohms. The horizontal axis shows four test conditions based upon Human Body Model (HBM) ESD events on the read differential signal pair.

There are four bar clusters, each associated with separate and successive ESD events. The two filled bars in each bar cluster represent readings from the quasi-static tester with read bias currents of +5 mA and −5 mA. The unfilled bar shows the differential MRR value obtained from first and second read current levels of 1 mA and −1 mA, respectively.

The first bar cluster is associated with a normal, undamaged read-write head. The second bar cluster shows the effect of an ESD event of +35 HBM Volts, which induces a pinned layer magnetization reversal, damaging the read-write head. The third bar cluster shows the effect of a second ESD event of −35 HBM Volts, which approximately recovers the magnetization of the pinned layer of the read-write head. The fourth bar cluster shows the effect of a third ESD event of +35 HBM Volts, again damaging the read-write head by reversing the magnetization of the pinned layer.

Figure 7:
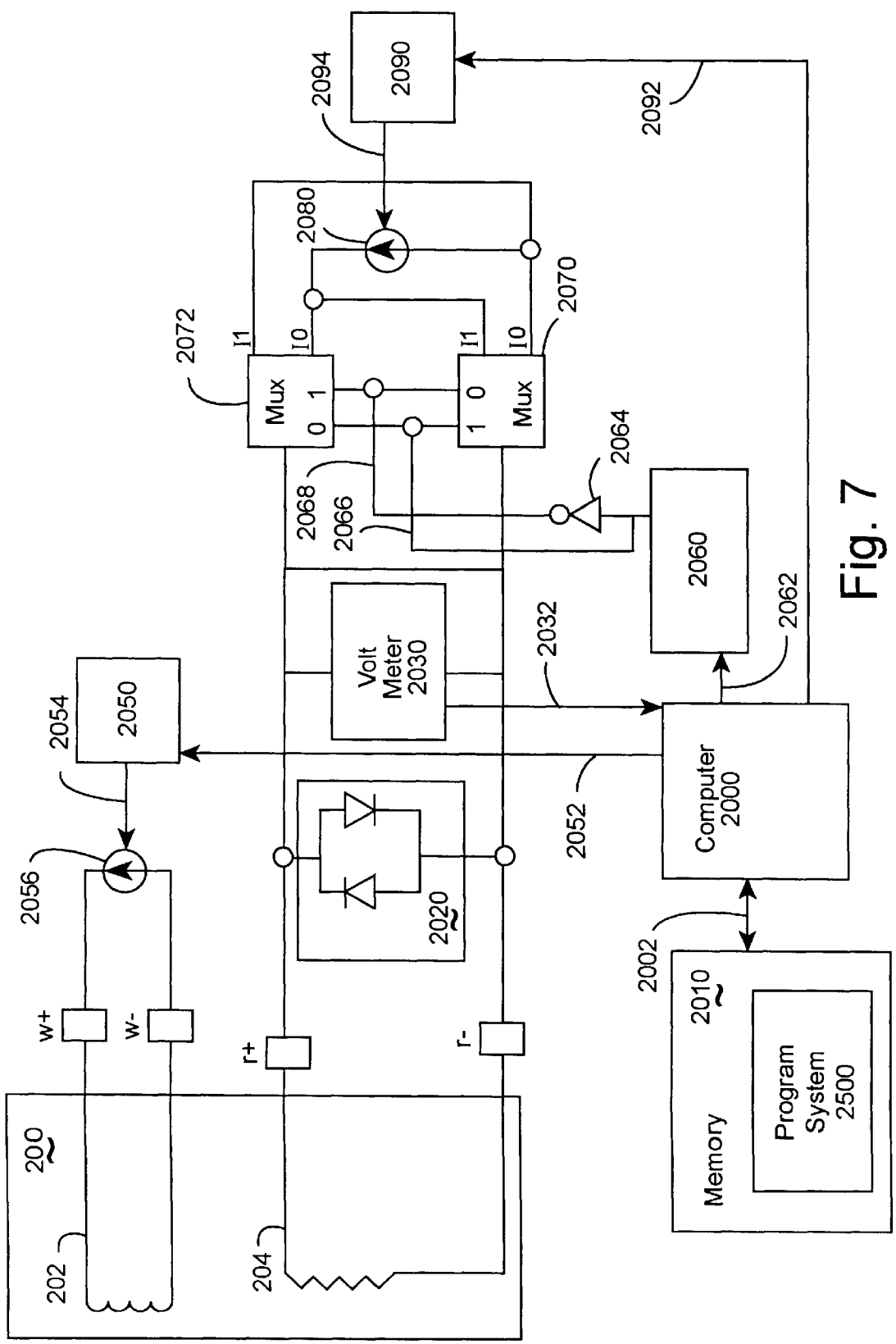
FIG. 7 illustrates a refinement of FIGS. 4B and 5B wherein computer 2000 can perform and control all steps of the testing method from program system 2500.

FIG. 7 illustrates a refinement of FIGS. 4B and 5B wherein computer 2000 can perform and control all steps of the testing method from program system 2500.

Figure 8:
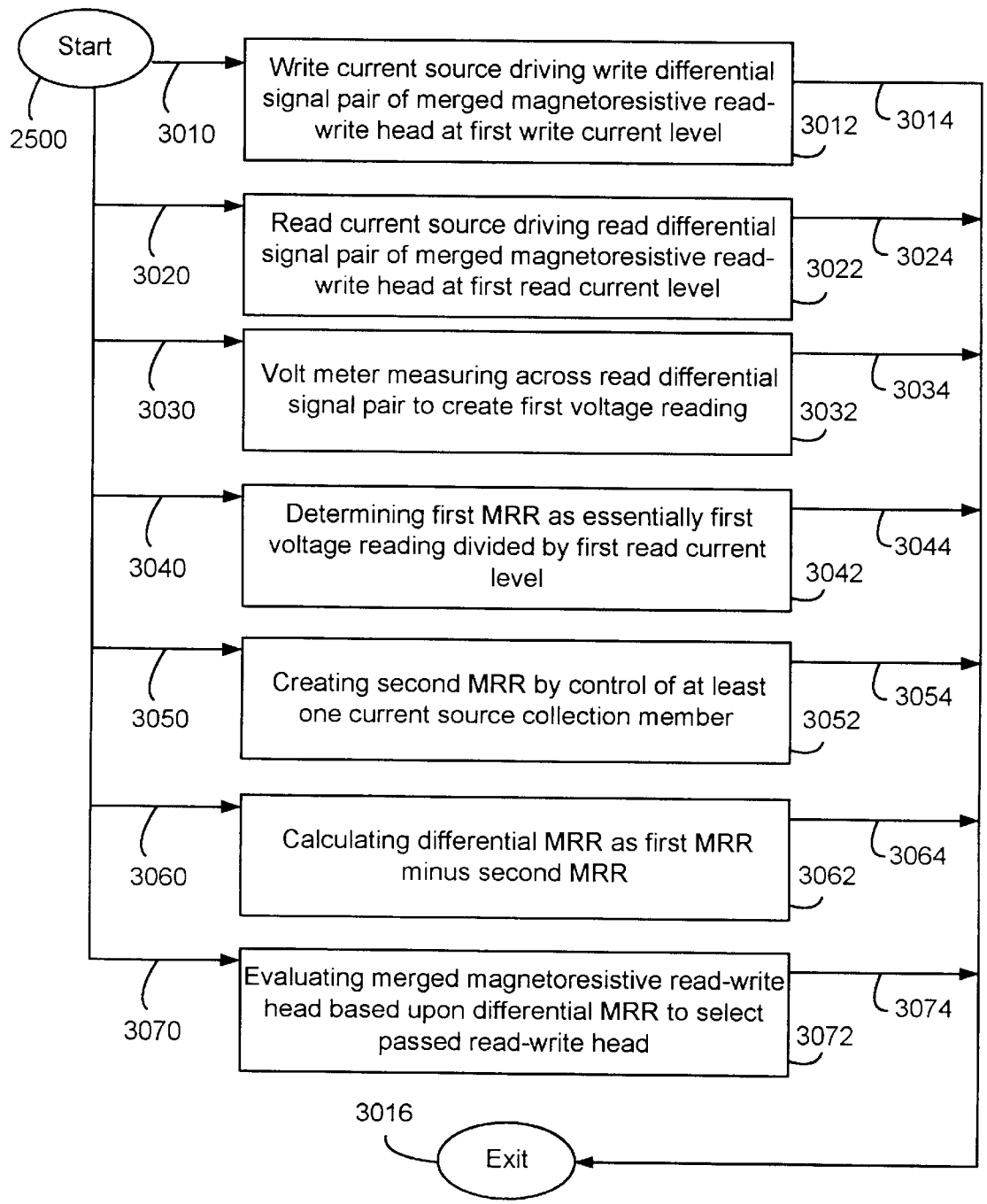
FIG. 8 illustrates a detail flowchart of program system 2500 of FIGS. 7 and 4B for determining performance of merged magnetoresistive read-write head 200 to select the passed read-write head.

FIG. 8 illustrates a detail flowchart of program system 2500 of FIGS. 7 and 4B for determining performance of merged magnetoresistive read-write head 200 to select the passed read-write head.

Arrow 3010 directs the flow of execution from starting operation 2500 to operation 3012. Operation 3012 performs a write current source driving a write differential signal pair of the merged magnetoresistive read-write head at a first write current level. Arrow 3014 directs execution from operation 3012 to operation 3016. Operation 3016 terminates the operations of this flowchart.

Arrow 3020 directs the flow of execution from starting operation 2500 to operation 3022. Operation 3022 performs a read current source driving a read differential signal pair of the merged magnetoresistive read-write head at a first read current level. Arrow 3024 directs execution from operation 3022 to operation 3016. Operation 3016 terminates the operations of this flowchart.

Arrow 3030 directs the flow of execution from starting operation 2500 to operation 3032. Operation 3032 performs a volt meter measuring across the read differential signal pair to create a first voltage reading. Arrow 3034 directs execution from operation 3032 to operation 3016. Operation 3016 terminates the operations of this flowchart.

Arrow 3040 directs the flow of execution from starting operation 2500 to operation 3042. Operation 3042 performs determining a first MRR as essentially the first voltage reading divided by the first read current level. Arrow 3044 directs execution from operation 3042 to operation 3016. Operation 3016 terminates the operations of this flowchart.

Arrow 3050 directs the flow of execution from starting operation 2500 to operation 3052. Operation 3052 performs creating a second MRR by control of at least one member of the current source collection. The current source collection comprises the read current source and the write current source. Arrow 3054 directs execution from operation 3052 to operation 3016. Operation 3016 terminates the operations of this flowchart.

Arrow 3060 directs the flow of execution from starting operation 2500 to operation 3062. Operation 3062 performs calculating a differential MRR as the first MRR minus the second MRR. Arrow 3064 directs execution from operation 3062 to operation 3016. Operation 3016 terminates the operations of this flowchart.

Arrow 3070 directs the flow of execution from starting operation 2500 to operation 3072. Operation 3072 performs evaluating the merged magnetoresistive read-write head based upon the differential MRR to select the passed read-write head. Arrow 3074 directs execution from operation 3072 to operation 3016. Operation 3016 terminates the operations of this flowchart.

Figure 9A:
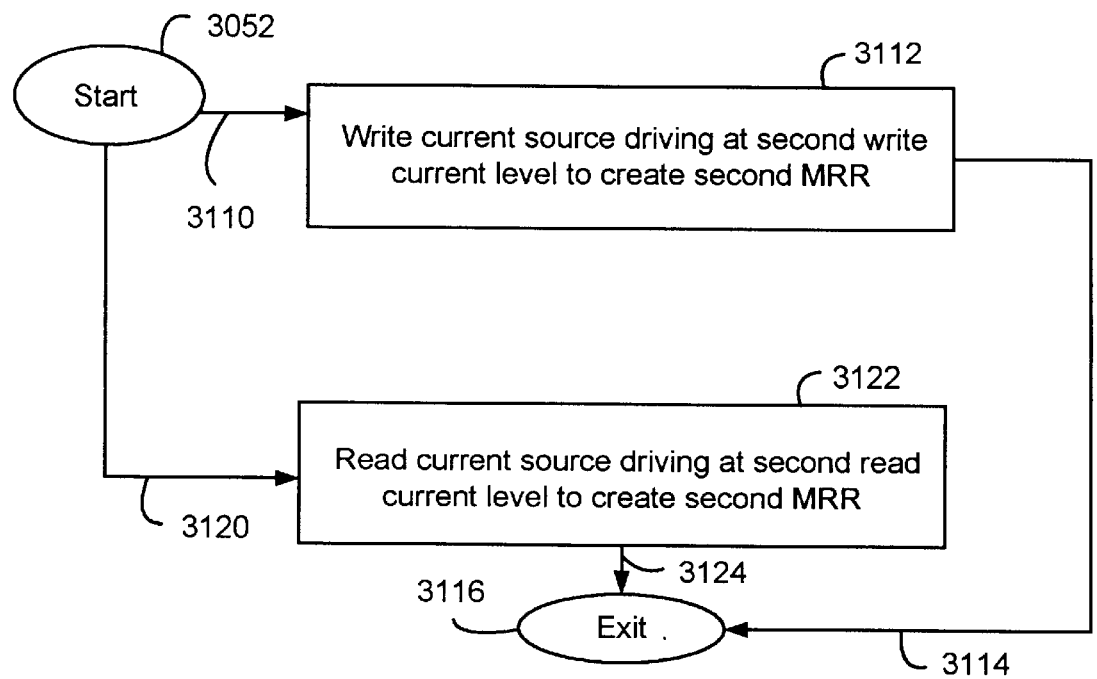
FIG. 9A illustrates a detail flowchart of operation 3052 of FIG. 8 for creating the second MRR.

FIG. 9A illustrates a detail flowchart of operation 3052 of FIG. 8 for creating the second MRR.

Arrow 3110 directs the flow of execution from starting operation 3052 to operation 3112. Operation 3112 performs the write current source driving at a second write current level to create the second MRR. Arrow 3114 directs execution from operation 3112 to operation 3116. Operation 3116 terminates the operations of this flowchart.

Arrow 3120 directs the flow of execution from starting operation 3052 to operation 3122. Operation 3122 performs the read current source driving at a second read current level to create the second MRR. Arrow 3124 directs execution from operation 3122 to operation 3116. Operation 3116 terminates the operations of this flowchart.

Figure 9B:
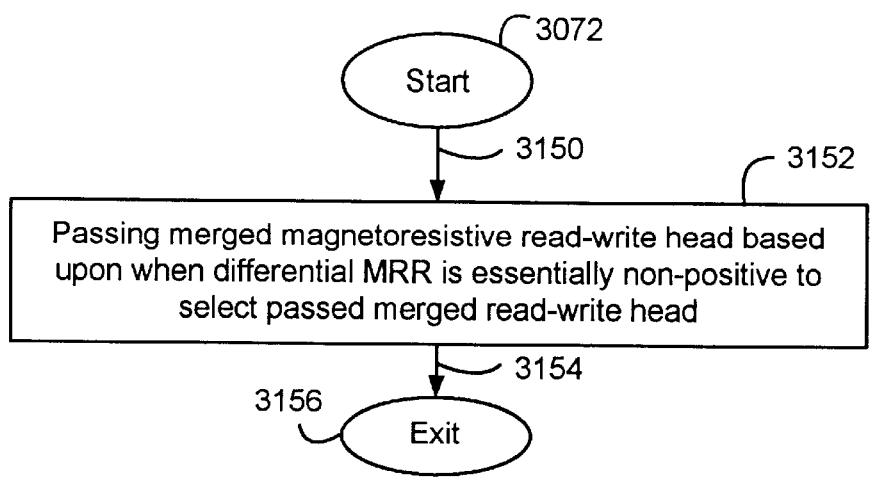
FIG. 9B illustrates a detail flowchart of operation 3072 of FIG. 8 for evaluating the merged magnetoresistive read-write head.

FIG. 9B illustrates a detail flowchart of operation 3072 of FIG. 8 for evaluating the merged magnetoresistive read-write head.

Arrow 3150 directs the flow of execution from starting operation 3072 to operation 3152. Operation 3152 performs passing the merged magnetoresistive read-write head based upon when the differential MRR is essentially non-positive to select the passed merged read-write head. Arrow 3154 directs execution from operation 3152 to operation 3156. Operation 3156 terminates the operations of this flowchart.

Figure 10A:
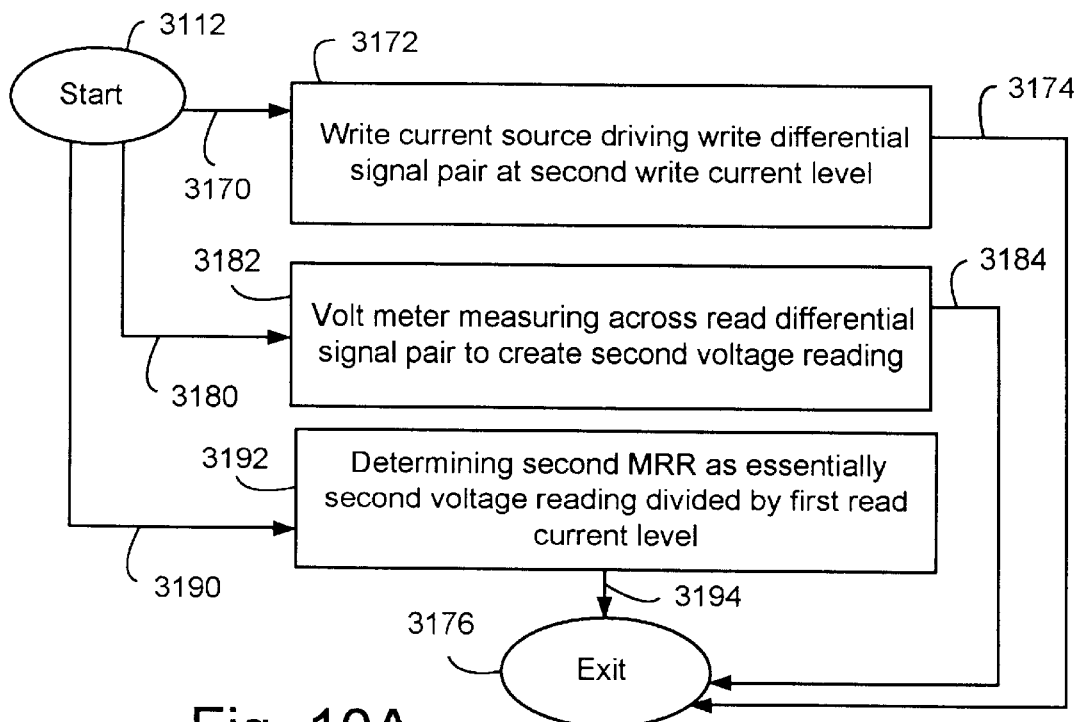
FIG. 10A illustrates a detail flowchart of operation 3112 of FIG. 9A for the write current source driving at the second write current level to create the second MRR.

FIG. 10A illustrates a detail flowchart of operation 3112 of FIG. 9A for the write current source driving at the second write current level to create the second MRR.

Arrow 3170 directs the flow of execution from starting operation 3112 to operation 3172. Operation 3172 performs the write current source driving the write differential signal pair at the second write current level. Arrow 3174 directs execution from operation 3172 to operation 3176. Operation 3176 terminates the operations of this flowchart.

Arrow 3180 directs the flow of execution from starting operation 3112 to operation 3182. Operation 3182 performs the volt meter measuring across the read differential signal pair to create the second voltage reading. Arrow 3184 directs execution from operation 3182 to operation 3176. Operation 3176 terminates the operations of this flowchart.

Arrow 3190 directs the flow of execution from starting operation 3112 to operation 3192. Operation 3192 performs determining the second MRR as essentially the second voltage reading divided by the first read current level. Arrow 3194 directs execution from operation 3192 to operation 3176. Operation 3176 terminates the operations of this flowchart.

Note that the second write current level may be within a first tolerance of the negative of the first write current level. The first tolerance may indicate a least significant bit, possibly belonging to the tolerance collection comprising the fractions: $1/16$, $1/32$, $1/64$, $1/128$, $1/256$, $1/512$, $1/1024$, $1/2048$, $1/4096$, $1/8192$, $1/16384$, and $1/32768$.

Figure 10B:
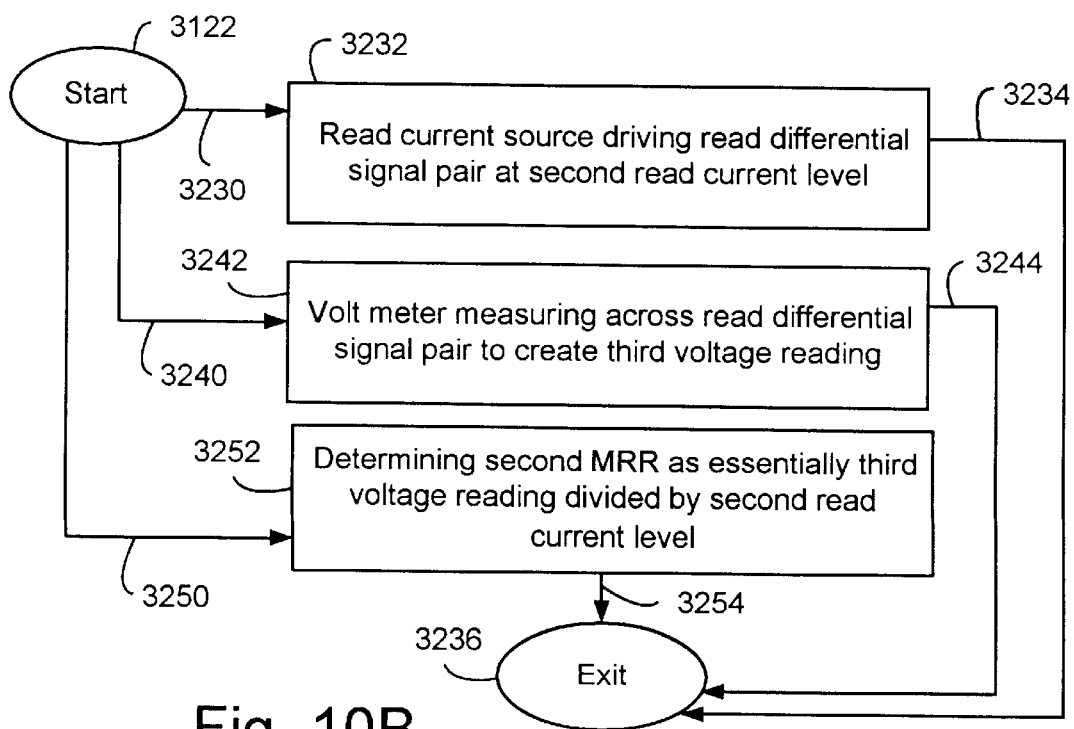
FIG. 10B illustrates a detail flowchart of operation 3122 of FIG. 9A for the read current source driving at the second read current level to create the second MRR.

FIG. 10B illustrates a detail flowchart of operation 3122 of FIG. 9A for the read current source driving at the second read current level to create the second MRR.

Arrow 3230 directs the flow of execution from starting operation 3122 to operation 3232. Operation 3232 performs the read current source driving the read differential signal pair at the second read current level. Arrow 3234 directs execution from operation 3232 to operation 3236. Operation 3236 terminates the operations of this flowchart.

Arrow 3240 directs the flow of execution from starting operation 3122 to operation 3242. Operation 3242 performs the volt meter measuring across the read differential signal pair to create a third voltage reading. Arrow 3244 directs execution from operation 3242 to operation 3236. Operation 3236 terminates the operations of this flowchart.

Arrow 3250 directs the flow of execution from starting operation 3122 to operation 3252. Operation 3252 performs determining the second MRR as essentially the third voltage reading divided by the second read current level. Arrow 3254 directs execution from operation 3252 to operation 3236. Operation 3236 terminates the operations of this flowchart.

Note that the second read current level may be within a second tolerance of the negative of the first read current level. The second tolerance may also be a member of the tolerance collection.

Figure 11A:
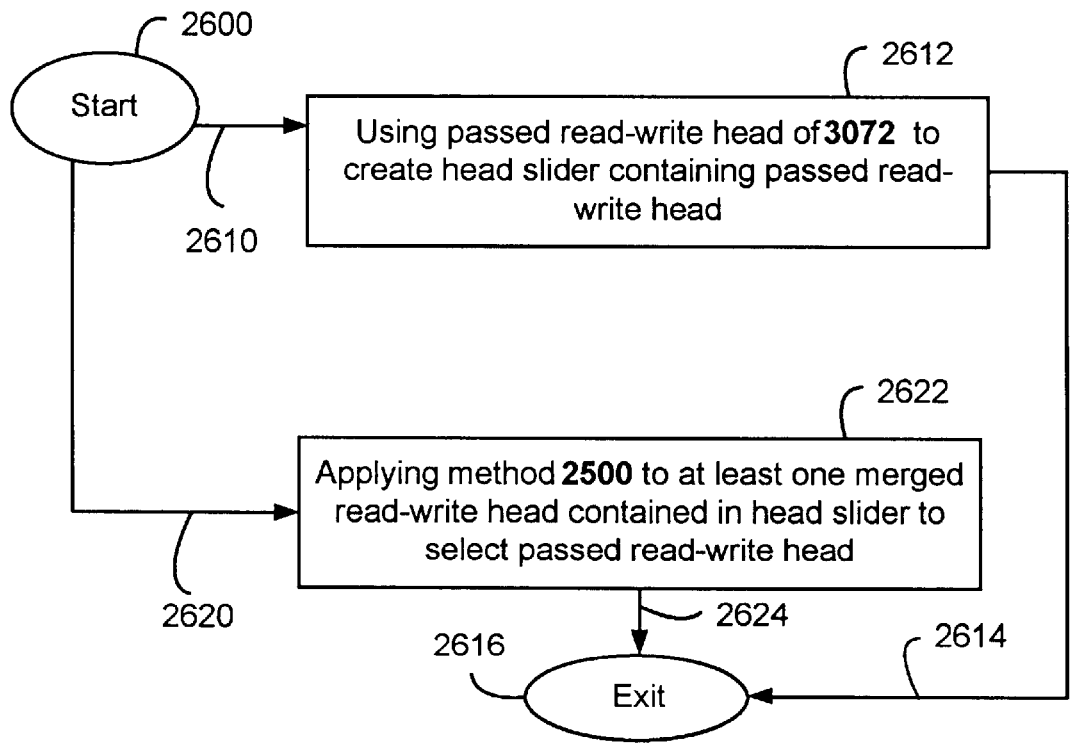
FIG. 11A illustrates a method 2600 for making a head slider.

FIG. 11A illustrates a method 2600 for making a head slider, comprising at least one of the following operations.

Arrow 2610 directs the flow of execution from starting operation 2600 to operation 2612. Operation 2612 performs using the passed read-write head of FIG. 8 to create the head slider containing the passed read-write head. Arrow 2614 directs execution from operation 2612 to operation 2616. Operation 2616 terminates the operations of this flowchart.

Arrow 2620 directs the flow of execution from starting operation 2600 to operation 2622. Operation 2622 performs applying the method 2500 to at least one merged magnetoresistive read-write head contained in the head slider to select the passed read-write head. Arrow 2624 directs execution from operation 2622 to operation 2616. Operation 2616 terminates the operations of this flowchart.

Figure 11B:
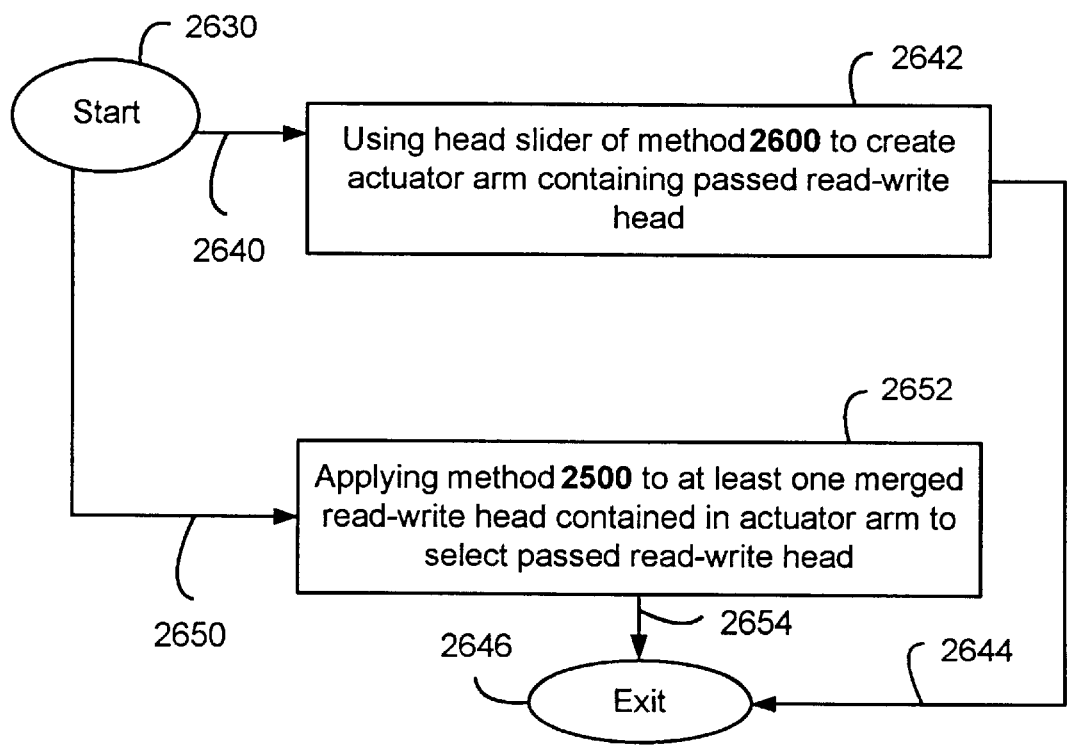
FIG. 11B illustrates a method 2630 for making an actuator arm.

FIG. 11B illustrates a method 2630 for making an actuator arm, comprising at least one of the following operations.

Arrow 2640 directs the flow of execution from starting operation 2630 to operation 2642. Operation 2642 performs using the head slider of method 2600 to create the actuator arm containing the passed read-write head. Arrow 2644 directs execution from operation 2642 to operation 2646. Operation 2646 terminates the operations of this flowchart.

Arrow 2650 directs the flow of execution from starting operation 2630 to operation 2652. Operation 2652 performs applying the method 2500 to at least one merged magnetoresistive read-write head contained in the actuator arm to select the passed read-write head. Arrow 2654 directs execution from operation 2652 to operation 2646. Operation 2646 terminates the operations of this flowchart.

Figure 12A:
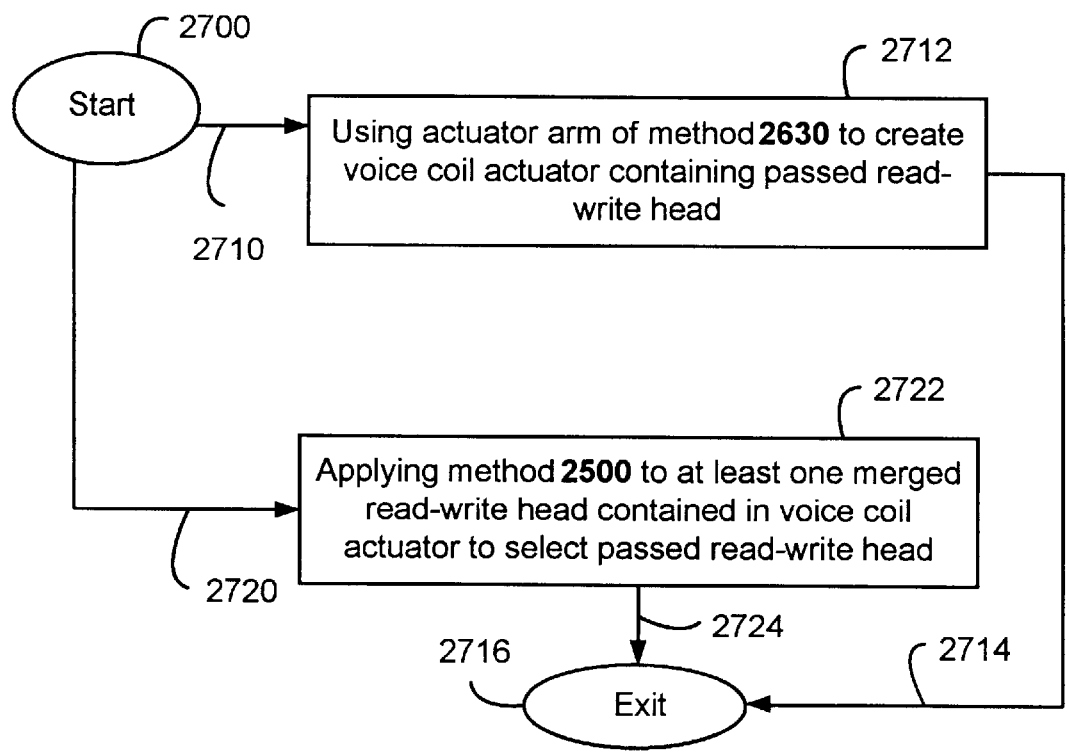
FIG. 12A illustrates a method 2700 for making a voice coil actuator.

FIG. 12A illustrates a method of making 2700 a voice coil actuator comprising at least one of the following operations.

Arrow 2710 directs the flow of execution from starting operation 2700 to operation 2712. Operation 2712 performs using the actuator arm of method 2630 to create the voice coil actuator containing the passed read-write head. Arrow 2714 directs execution from operation 2712 to operation 2716. Operation 2716 terminates the operations of this flowchart.

Arrow 2720 directs the flow of execution from starting operation 2700 to operation 2722. Operation 2722 performs applying the method 2500 to at least one merged magnetoresistive read-write head contained in the voice coil actuator to select the passed read-write head. Arrow 2724 directs execution from operation 2722 to operation 2716. Operation 2716 terminates the operations of this flowchart.

Figure 12B:
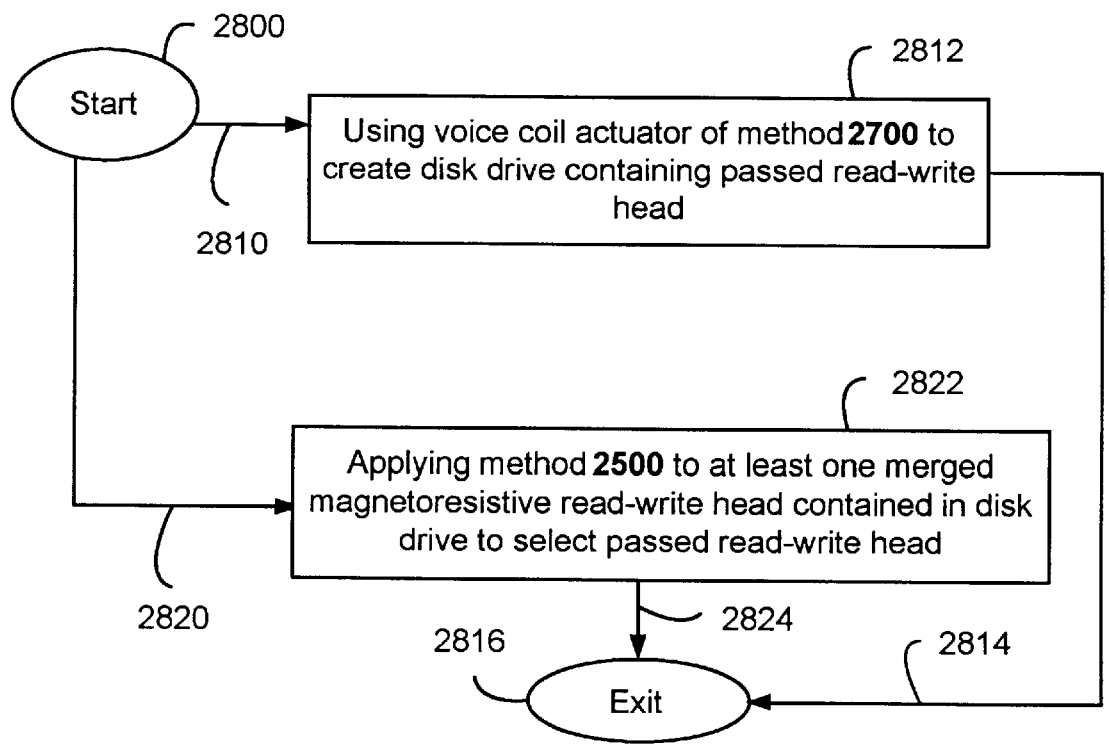
FIG. 12B illustrates a method 2800 for making a disk drive.

FIG. 12B illustrates a method 2800 of making a disk drive comprising at least one of the following operations.

Arrow 2810 directs the flow of execution from starting operation 2800 to operation 2812. Operation 2812 performs using the voice coil actuator of method 2700 to create the disk drive containing the passed read-write head. Arrow 2814 directs execution from operation 2812 to operation 2816. Operation 2816 terminates the operations of this flowchart.

Arrow 2820 directs the flow of execution from starting operation 2800 to operation 2822. Operation 2822 performs applying the method 2500 to at least one merged read-write magnetoresistive read-write head contained in the disk drive to select the passed read-write head. Arrow 2824 directs execution from operation 2822 to operation 2816. Operation 2816 terminates the operations of this flowchart.

The preceding embodiments have been provided by way of example and are not meant to constrain the scope of the following claims.

What is claimed is:

1. A test system determining performance of a merged magnetoresistive read-write head to select a passed read-write head, comprising:
    a write current source driving a write differential signal pair of said merged magnetoresistive read-write head at a first write current level;
    a read current source driving a read differential signal pair of said merged magnetoresistive read-write head at a first read current level;
    a volt meter measuring across said read differential signal pair to create a first voltage reading;
    means for determining a first Merged Read-write head Resistively as essentially said first voltage reading divided by said first read current level;
    means for creating a second MRR by control of at least one member of the current source collection comprising said read current source and said write current source;
    means for calculating a differential MRR as said first MRR minus said second MRR; and
    means for evaluating said merged magnetoresistive read-write head based upon said differential MRR to create said passed read-write head; and
    an ESD protection circuit coupled across said read differential signal pair protecting said merged magnetoresistive read-write head from ESD;
    wherein said means for creating said second MRR is further comprised of at least one member of the collection including the steps of:
        said write current source driving at a second write current level to create said second MRR; and
        said read current source driving at a second read current level to create said second MRR;
    wherein said means for evaluating said merged magnetoresistive read-write head is further comprised of:
        means for passing said merged magnetoresistive read-write head based upon when said differential MRR is essentially non-positive to select said passed merged read-write head.

2. The apparatus of claim 1,
    wherein the means for asserting said write current source at said second write current level to create said second MRR is further comprised of:
        said write current source driving said write differential signal pair at said second write current level;
        said volt meter measuring across said read differential signal pair to create said second voltage reading; and
        means for determining said second MRR as essentially said second voltage reading divided by said first read current level;
    wherein said second write current level is within a first tolerance of a negation of said first write current level; and
    wherein said first tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

3. The apparatus of claim 1,
    wherein said read current source driving at said second read current level to create said second MRR is further comprised of:
        said read current source driving said read differential signal pair at said second read current level;
        said volt meter measuring across said read differential signal pair to create a third voltage reading; and
        means for determining said second MRR as essentially said third voltage reading divided by said second read current level;
    wherein said second read current level is within a second tolerance of a negation of said first read current level; and
    wherein said second tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

4. The apparatus of claim 1,
    wherein said write current source driving said write differential signal pair is further comprised of at least one member of the collection including:
        a computer acting upon a write current source interface to control said write current source;
        a finite state machine controlling said write current source;
        a neural network controlling said write current source; and
        a human operator controlling said write current source.

5. The apparatus of claim 1,
    wherein said read current source driving said read differential signal pair is further comprised of at least one member of the collection including:
        a computer acting upon a read current source interface to control said read current source;
        a finite state machine controlling said read current source;
        a neural network controlling said read current source; and
        a human operator controlling said read current source.

6. The apparatus of claim 1,
    wherein said volt meter measuring across said read differential signal pair to create said first voltage reading is further comprised of at least one member of the collection including:
        a computer accessing an analog-to-digital interface coupled with said read differential signal pair to create said first voltage reading;
        a finite state machine measuring across said read differential signal pair to create said first voltage reading;

a neural network accessing said analog-to-digital interface coupled with said read differential signal pair to create said first voltage reading; and a human operator reading said voltmeter to create said first voltage reading.

7. The apparatus of claim 1, wherein at least one member of the collection comprising said means for determining said first MRR, said means for calculating said differential MRR, and said means for evaluating said merged magnetoresistive read-write head implemented as at least one program step residing in a memory of at least one computer operating based upon said program step.

8. A method of determining performance of a merged magnetoresistive read-write head to select a passed read-write head, comprising the steps of:

a write current source driving a write differential signal pair of said merged magnetoresistive read-write head at a first write current level;

a read current source driving a read differential signal pair of said merged magnetoresistive read-write head at a first read current level;

a volt meter measuring across said read differential signal pair to create a first voltage reading;

determining a first MRR as essentially said first voltage reading divided by said first read current level;

creating a second MRR by control of at least one member of the current source collection comprising said read current source and said write current source;

calculating a differential MRR as said first MRR minus said second MRR; and evaluating said merged magnetoresistive read-write head based upon said differential MRR to select said passed read-write head;

wherein the step creating said second MRR is further comprised of at least one member of the collection including the steps of:

said write current source driving at a second write current level to create said second MRR; and said read current source driving at a second read current level to create said second MRR;

wherein the step evaluating said merged magnetoresistive read-write head is further comprised of the step of:

passing said merged magnetoresistive read-write head based upon when said differential MRR is essentially non-positive to select said passed merged read-write head;

wherein said read differential signal pair is protected from ESD whenever said read current source drives said read differential signal pair and whenever said volt meter measures across said read differential signal pair.

9. The method of claim 8, wherein the step of said write current source driving at said second write current level to create said second MRR is further comprised of the steps of:

said write current source driving said write differential signal pair at said second write current level;

said volt meter measuring across said read differential signal pair to create said second voltage reading; and determining said second MRR as essentially said second voltage reading divided by said first read current level.

10. The method of claim 9, wherein said second write current level is within a first tolerance of a negation of said first write current level;

wherein said first tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

11. The method of claim 8, wherein the step of said read current source driving at said second read current level to create said second MRR is further comprised of the steps of:

said read current source driving said read differential signal pair at said second read current level;

said volt meter measuring across said read differential signal pair to create a third voltage reading; and determining said second MRR as essentially said third voltage reading divided by said second read current level.

12. The method of claim 11, wherein said second read current level is within a second tolerance of a negation of said first read current level;

wherein said second tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

13. Said passed read-write head as a product of the process of claim 8.

14. A process of making a head slider, comprising at least one member of the collection including the steps of:

using said passed read-write head of claim 8 to create said head slider containing said passed read-write head; and applying the method of claim 8 to at least one merged magnetoresistive read-write head contained in said head slider to select said passed read-write head.

15. Said head slider as a product of the process of claim 14.

16. A process of making an actuator arm, comprising at least one member of the collection including the steps of:

using a head slider containing said passed read-write head of claim 8 to create said actuator arm containing said passed read-write head; and applying the method of claim 8 to at least one merged magnetoresistive read-write head contained in said actuator arm to select said passed read-write head.

17. Said actuator arm as a product of the process of claim 16.

18. A process of making a voice coil actuator, comprising at least one member of the collection including the steps of:

using an actuator arm containing said passed read-write head of claim 8 to create said voice coil actuator containing said passed read-write head; and applying the method of claim 8 to at least one merged magnetoresistive read-write head contained in said voice coil actuator to select said passed read-write head.

19. Said voice coil actuator as a product of the process of claim 18.

20. A process of making a disk drive, comprising at least one member of the collection including the steps of:

using a voice coil actuator containing said passed read-write head of claim 8 to create said disk drive containing said passed read-write head; and applying the method of claim 8 to at least one merged magnetoresistive read-write head contained in said disk drive to select said passed read-write head.

21. Said disk drive as a product of the process of claim 20.

22. A program system implementing the method of claim 8, comprising:

program steps residing in a memory accessibly coupled to at least one computer implementing at least part of each of the steps of the method of claim 8.

23. A test system determining performance of a merged magnetoresistive read-write head to select a passed read-write head, comprising:
- a write current source driving a write differential signal pair of said merged magnetoresistive read-write head at a first write current level;
- a read current source driving a read differential signal pair of said merged magnetoresistive read-write head at a first read current level;
- a volt meter measuring across said read differential signal pair to create a first voltage reading;
- an ESD protection circuit coupled across said read differential signal pair protecting said merged magnetoresistive read-write head from ESD;
- means for determining a first MRR as essentially said first voltage reading divided by said first read current level;
- means for creating a second MRR created by control of at least one member of a current source collection comprising said read current source and said write current source;
- means for calculating a differential MRR as essentially said first MRR minus said second MRR; and
- an evaluation mechanism of said merged magnetoresistive read-write head based upon said differential MRR to select said passed read-write head.

24. The apparatus of claim 23,
wherein said second MRR is created by at least one member of the collection comprising:
- said write current source driving at a second write current level to create said second MRR; and
- said read current source driving at a second read current level to create said second MRR.

25. The apparatus of claim 23,
wherein said write current source driving at said second write current level to create said second MRR is further comprised of:
- said write current source driving said write differential signal pair at said second write current level;
- said volt meter measuring across said read differential signal pair to create said second voltage reading; and
- means for determining said second MRR as essentially said second voltage reading divided by said first read current level;
- wherein said second write current level is within a first tolerance of a negation of said first write current level;
- wherein said first tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

26. The apparatus of claim 23,
wherein said read current source driving at said second read current level to create said second MRR is further comprised of:
- said read current source driving said read differential signal pair at said second read current level; and
- said volt meter measuring across said read differential signal pair to create a third voltage reading;
- means for determining said second MRR as essentially said third voltage reading divided by said second read current level;
- wherein said second read current level is within a second tolerance of a negation of said first read current level;
- wherein said second tolerance is a member of a tolerance collection comprised of $1/16$, $1/32$, $1/64$, $1/128$, $1/256$, $1/512$, $1/1024$, $1/2048$, $1/4096$, $1/8192$, $1/16384$, and $1/32768$.

27. The apparatus of claim 23,
wherein said evaluation mechanism of said merged magnetoresistive read-write head creation is further comprised of:
- means for determining when said differential MRR is essentially non-positive; and
- means for passing said merged magnetoresistive read-write head based upon when said differential MRR is essentially non-positive to select said passed merged read-write head.

28. The apparatus of claim 23,
wherein said write current source driving said write differential signal pair is further comprised of at least one member of the collection comprising:
- a computer acting upon a write current source interface to control said write current source;
- a finite state machine controlling said write current source;
- a neural network controlling said write current source; and
- a human operator controlling said write current source.

29. The apparatus of claim 23,
wherein said read current source driving said read differential signal pair is further comprised of at least one member of the collection comprising:
- a computer acting upon a read current source interface to control said read current source;
- a finite state machine controlling said read current source;
- a neural network controlling said read current source; and
- a human operator controlling said read current source.

30. The apparatus of claim 23,
wherein said volt meter measuring across said read differential signal pair is further comprised of at least one member of the collection including:
- a computer accessing an analog-to-digital interface coupled with said read differential signal pair to create said first voltage reading;
- a finite state machine measuring across said read differential signal pair to create said first voltage reading;
- a neural network accessing said analog-to-digital interface coupled with said read differential signal pair to create said first voltage reading; and
- a human operator reading said voltmeter to create said first voltage reading.

* * * * *

UNITED STATES PATENT AND TRADEMARK OFFICE
CERTIFICATE OF CORRECTION

PATENT NO. : 6,710,594 B2
DATED : March 23, 2004
INVENTOR(S) : Eunkyu Jang and Hyung Jai Lee It is certified that error appears in the above-identified patent and that said Letters Patent is hereby corrected as shown below:

<u>Title page,</u>
Item [12], please change "Eunkyu" to -- Jang --
Item [75], Inventors, please change "Eunkyu Eunkyu" to -- Eunkyu Jang --

Signed and Sealed this

Twenty-fifth Day of May, 2004

JON W. DUDAS
*Acting Director of the United States Patent and Trademark Office*